US011035695B2

(12) United States Patent
Kuzmanovic et al.

(10) Patent No.: US 11,035,695 B2
(45) Date of Patent: Jun. 15, 2021

(54) PSEUDO ZERO POWER POSITION INDICATION

(71) Applicant: Parker-Hannifin Corporation, Cleveland, OH (US)

(72) Inventors: Michael M. Kuzmanovic, Irvine, CA (US); Robert Brennan, Jr., Irvine, CA (US); Matthew Latham, Orange, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 419 days.

(21) Appl. No.: 16/001,969

(22) Filed: Jun. 7, 2018

(65) Prior Publication Data

US 2018/0356251 A1 Dec. 13, 2018

Related U.S. Application Data

(60) Provisional application No. 62/516,265, filed on Jun. 7, 2017.

(51) Int. Cl.
*G01D 5/14* (2006.01)
*G01D 5/26* (2006.01)
*G01D 21/00* (2006.01)

(52) U.S. Cl.
CPC ............. *G01D 5/142* (2013.01); *G01D 21/00* (2013.01); *G01D 5/26* (2013.01)

(58) Field of Classification Search
None
See application file for complete search history.

(56) References Cited

U.S. PATENT DOCUMENTS

| 8,239,881 B2 | 8/2012 | Harrington |
| 9,263,217 B2 | 2/2016 | Ball |
| 2010/0252759 A1* | 10/2010 | Guler ..................... E03D 3/06 251/129.04 |
| 2010/0294373 A1* | 11/2010 | Haller ................ F16K 37/0041 137/1 |

(Continued)

OTHER PUBLICATIONS

Global Resources, Inc., Zero Power Position Sensor, spec sheet, https://www.gsglobalresources.com/uploads/ioral_jz_zero_power_absolute_rotary1.pdf.

*Primary Examiner* — Patrick Assouad
*Assistant Examiner* — Haidong Zhang
(74) *Attorney, Agent, or Firm* — Renner, Otto, Boisselle & Sklar, LLP

(57) ABSTRACT

A method and device detect the position of a device utilizing electronic sensors in applications with negligible power resources. The method utilizes an indicator circuit for monitoring a position of a device, the indicator circuit including a position sensor configured to detect a position of the device, a first position indicator operatively coupled to the position sensor and configured to provide a position output corresponding to the position of the device based on the position of the device as detected by the position sensor, a first sense line for receiving a sense voltage from a second position indicator different from the first position indicator; and an energy harvesting device operatively coupled to the first sense line, the position sensor and the first position indicator. The energy harvesting device is configured to harvest electric energy from the sense voltage, wherein the position sensor and the first position indicator obtain electric power from the harvested electric energy.

16 Claims, 5 Drawing Sheets

(56) References Cited

U.S. PATENT DOCUMENTS

| | | | |
|---|---|---|---|
| 2014/0096850 A1* | 4/2014 | Filkovski | F16K 37/0033 |
| | | | 137/554 |
| 2015/0107675 A1* | 4/2015 | Kucera | F16K 37/0041 |
| | | | 137/1 |
| 2016/0025765 A1 | 1/2016 | Panther et al. | |
| 2017/0030956 A1 | 2/2017 | McCammon et al. | |

\* cited by examiner

PSEUDO ZERO POWER POSITION INDICATION

This application claims priority to U.S. Provisional Application No. 62/516,265 filed on Jun. 7, 2017, the contents of which is hereby incorporated by reference in its entirety.

TECHNICAL FIELD

The present invention relates generally to sensors and, more particularly, to a sensor circuit that can operate at negligibly low power consumption. A contextual example of this could be when actuator operating power is removed from an actuator command circuit, the actuator must still provide position indication.

BACKGROUND INFORMATION

Many end-user platforms require position indication even when insufficient power exists to operate traditional electronic sensors. Historically, this has precluded the use of various "electronic" sensor technologies, since they require power to operate. As a result, mechanical switches are commonly used to provide position indication. Drawbacks to using mechanical switches include tedious adjustment, sensitivity to contamination, mechanical wear, inconsistent performance at low switch actuation speeds, etc.

Accordingly, there is a need in the art for a sensing device that can function when operating power is lost, while also not having one or more of the drawbacks of mechanical switches.

SUMMARY OF THE INVENTION

A position indication circuit and method in accordance with the present invention enables electronic sensors and other like-type devices to be used in electrical circuits while still providing meaningful data when operating power is lost or otherwise removed. More particularly, a circuit and method in accordance with the present invention, upon loss of operating power, harvests minute levels of power from a signal line not intended to provide power, without impacting its logic state. The required energy is minimal because the sensor is operating on a low duty-cycle while sustaining an output. This enables electronic sensors to be utilized that provide non-contact position indication, insusceptible to contamination, require little or no adjustment, and operate over a wide range of speeds.

According to one aspect of the invention, an indicator circuit for monitoring a position of a device includes: a position sensor configured to detect a position of the device; a first position indicator operatively coupled to the position sensor and configured to provide a position output corresponding to the position of the device based on the position of the device as detected by the position sensor; a first sense line for receiving a sense voltage from a second position indicator different from the first position indicator; and an energy harvesting device operatively coupled to the first sense line, the position sensor and the first position indicator, the energy harvesting device configured to harvest electric energy from the sense voltage, wherein the position sensor and the first position indicator obtain electric power from the harvested electric energy.

Optionally, the indicator circuit further includes the second position indicator, wherein the second position indicator is complementary to the first position indicator.

Optionally, the first sense line corresponds to the second position indicator, further comprising at least one other sense line that corresponds to the first position indicator.

Optionally, the indicator circuit further includes a plurality of other position indicators, wherein the at least one other sense line comprises a plurality of other sense lines, respective ones of the plurality of other sense lines corresponding to respective ones of the plurality of other position indicators.

Optionally, the indicator circuit further includes an operating power input for receiving operating power to operate the indicator circuit, wherein the first position indicator obtains electric power from the operating power input when operating power is present.

Optionally, the position sensor comprises an electronic sensor.

Optionally, the position sensor comprises at least one of a hall-effect device or an optical sensor.

Optionally, the first position indicator comprises a semiconductor device.

Optionally, the indicator circuit further includes a timing and driver module operatively coupled to the energy harvesting device and the first position indicator, the timing and driver module configured to provide power to the first position indicator upon an energy level harvested by the energy harvesting device exceeding a prescribed threshold level.

Optionally, the timing and driver module comprises an RC timing circuit

Optionally, the first position indicator is configured to hold the position output over a duty cycle of the energy harvesting device.

According to another aspect of the invention, an indicator circuit for driving and sensing an output of a position sensor includes: a storage and timing device for receiving energy from a secondary energy source, the storage and timing device storing energy until a predetermined threshold is met during a duty cycle; a sensor driver connected to the storage and timing device for receiving energy from the storage and timing device when the threshold is met and driving and receiving an output signal from the position sensor, the sensor driver also receiving energy from a primary energy source when present; and a position indicator output device connected to the sensor driver which receives the output signal from the driver as a position characteristic of the position sensor, wherein the position indicator output device holds the position characteristic during the duty cycle, and can be connected to a position monitor to receive the output signal.

According to another aspect of the invention, a method for monitoring a position of a device via a circuit powered by a primary power source includes: when the primary power source is inoperative, harvesting energy from a position indicator of a first sensor corresponding to the device being monitored, the position indicator connected to a secondary power source different from the primary power source; using the harvested energy over a duty cycle to intermittently power the circuitry; and using the circuitry to detect a position of the device when the intermittent power is present.

Optionally, the position indicator comprises a first position indicator, and harvesting comprises using a sense voltage from a second position indicator that is complementary to the first position indicator.

Optionally, the method further includes outputting and holding the detected position over the duty cycle when the primary power is inoperative.

Optionally, harvesting comprises storing energy until a stored energy exceeds a predetermined threshold level, and outputting the stored energy upon reaching or exceeding the predetermined threshold level.

Optionally, the duty cycle comprises storing energy from an empty energy state to a full energy storage state and discharging the stored energy to the empty state.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The present invention will be described in the context of a position sensing system for a valve actuator. It will be appreciated, however, that the aspects of the invention can be used in other applications. In particular, aspects of the invention are applicable to any application in which a device is driven (linearly or rotationally) from one position to any number of other positions and it is desired to know which position the device is in when operating power is unavailable.

Figure 1:
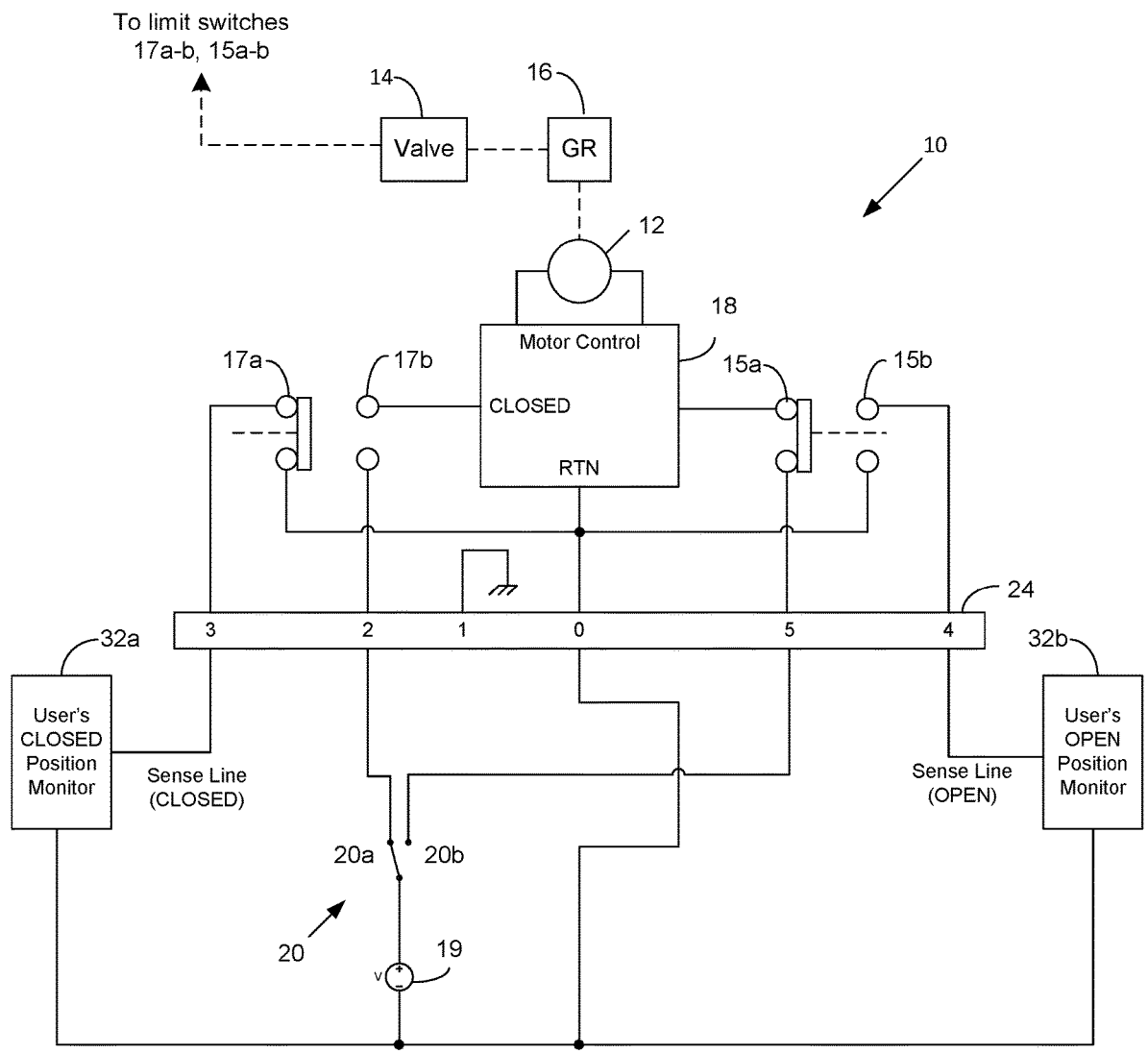
FIG. 1 is a simplified schematic of an exemplary actuator circuit employing mechanical switches for position sensing.

Referring initially to FIG. 1, illustrated is a control system 10 for moving a valve between a first state (e.g., an open state) and a second state (e.g., a closed state); the control system 10 is shown in the CLOSED state. The system 10 includes an actuator 12, such as an electric motor or the like, coupled to a valve 14 via a drive mechanism 16, such as a gear reduction drive system. The actuator 12 causes motion of the valve 14 between the open and closed state. OPEN/CLOSED switches 17a and 15b monitor a position of the valve 14 and are referred to as position indication switches, while switches 17b and 15a switch power to the motor controller 18 to drive the valve 14 in their respective directions. In the exemplary system of FIG. 1, the position indication switches 15b and 17a are embodied as limit switches in the form of two single-pole, double-throw, double-break switches. Switches 15a and 17b are the other pole-pair of switches 15b and 17a, respectively. As will be appreciated, other types and quantities of switches may be employed.

A controller 18, such as a motor controller or the like, is operationally connected to the actuator 12 via actuator terminals. The controller 18 operates the actuator 12 based on a user-operated switch 20, such as a selector switch or the like. A connector 24 provides electrical connections to/from the controller 18 and associated circuitry.

More particularly, terminal 0 (signal common) of the connector 24 is electrically connected to a return (RTN) terminal of the controller 18, to a first terminal of a CLOSED indication switch 17a and to a first terminal of an OPEN indication switch 15b. Terminal 1 of the connector 24 is connected to chassis ground, while terminal 2 of the connector 24 is connected to a first terminal of a CLOSED switch 17b. A second terminal of the CLOSED switch 17b is connected to a CLOSED input of the controller 18. Terminal 3 of the connector 24 is connected to a second terminal of the CLOSED indication switch 17a.

Terminal 5 of the connector 24 is connected to a first terminal of an OPEN switch 15a, and a second terminal of the OPEN switch 15a is connected to an OPEN input of the controller 18. Terminal 4 of the connector 24 is connected to a second terminal of the OPEN indication switch 15b.

A three-position return to center selector switch 20 includes a CLOSED contact 20a and an OPEN contact 20b. A first terminal of the CLOSED contact 20a and a first terminal of the OPEN contact 20b are both connected to a positive terminal of a primary power source 19 (operating power), while the negative terminal of the power source 19 is connected to terminal 0 of the connector 24. A second terminal of the CLOSED contact 20a is connected to terminal 2 of the connector 24, and a second terminal of the OPEN contact 20b is connected to terminal 5 of the connector 24. Terminals 3 and 4 provide CLOSED and OPEN position feedback, respectively, to the user's position monitor 32a and 32b by providing ground (in position) or OPEN (not in position).

In operation, when the CLOSED indication switch 17a is open and the switch 17b is closed (indicating that the valve is not in the CLOSED position) and power is applied to terminal 2 via the CLOSED contact 20a of the selector switch 20, the CLOSED terminal of the controller 18 is connected to control power via terminal 2 of the connector 24, while the OPEN terminal of the controller 18 floats. The controller 18, detecting that the CLOSED terminal has power, commands CLOSED rotation of the actuator 12 and thus CLOSED rotation of the valve 14. When the valve reaches the full CLOSED position, the switch 17b will open thereby removing power from the CLOSED terminal of the controller 18 and thus stopping CLOSED rotation. Also, the CLOSED indication switch 17a will close providing confirmation (ground) that the valve is in the CLOSED position.

Conversely, when the OPEN indication switch 15b is open and switch 15a is closed (indicating that the valve is not in the OPEN position) and power is applied to terminal 5 via the OPEN contact 20b of the selector switch 20, the OPEN terminal of the controller 18 is connected to control power via terminal 5 of the connector 24, while the CLOSED terminal of the controller 18 floats. The controller 18, detecting that the OPEN terminal has power, commands OPEN rotation of the actuator 12 and thus OPEN rotation of the valve 14. When the valve reaches the full OPEN position, the switch 15a will open thereby removing power from the OPEN terminal of the controller 18 and thus stopping OPEN rotation. Also, OPEN indication switch 15b will close providing confirmation (ground) that the valve is in the OPEN position.

As noted above, it is desirable to know the position of the valve 14 even when operating power to the control system 10 is removed (e.g., when primary power source 19 is unavailable). Conventionally, such position detection has been implemented using mechanical contacts (switches 17*a* and 15*b* in FIG. 1), as electronic devices generally will not operate when operating power is lost.

An indicator circuit in accordance with the present invention harvests energy from alternate sense line(s) when the primary (actuator operating) power source is disconnected or otherwise not operational. More particularly, the sense lines for the device being monitored are utilized to harvest energy and the harvested energy is periodically utilized to read a state of the sensor, and hold that state over a charge/discharge duty cycle.

As used herein, a primary power source is defined as a power source that provides power to operate the actuator. A secondary power source is defined as a power source used to determine position indication, which traditionally has not had sufficient power to operate electronic sensors.

Figure 2:
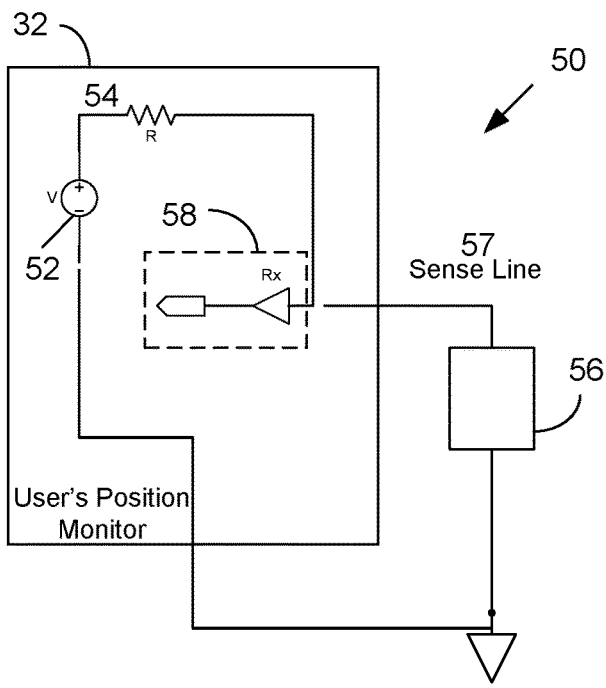
FIG. 2 is a simplified schematic of an exemplary application of a circuit in accordance with the invention.

Referring briefly to FIG. 2, illustrated is a conventional circuit 50 for detecting the state of a device 56 to be monitored having two states, e.g., a low impedance state and a high impedance state. The circuit 50 includes a secondary power source 52, which may provide a voltage as required by the specific application (e.g., 28 volts in an aircraft application). The secondary power source 52, for example, may be a power source utilized to power an I/O circuit for monitoring a state of the device 56 having two states. In the exemplary embodiment of FIG. 2 the secondary power source 52, which is different from the primary power source (item 19), has a negative terminal connected to signal common and a positive terminal connected to a first terminal of a resistor 54. A second terminal of the resistor 54 is connected to a first terminal of the device to be monitored 56, while the second terminal of the device to be monitored 56 is connected to signal common. A device 58 having a high input impedance, such as a digital input, is connected between the resistor 54 and device to be monitored 56. The connection between the input device 58, the device to be monitored 56 and the resistor 54 is referred to as the "sense line" 57. While only a single input is illustrated in FIG. 2, there may be a number of different inputs connected to various I/O points. Further, the secondary power source 52, resistor 54 and input device 58 may form at least a portion of the user's position monitor 32 referenced in FIG. 1.

When the device 56 is in the high-impedance state, very little current flows through the resistor 54 and thus the voltage provided by the secondary power source 52 is presented at the input device 58. Conversely, when the device 56 is in the low impedance state current flows through the resistor 54, and substantially all of the voltage is dropped across the resistor 54. Consequently, the voltage at the input device 58 is substantially at 0 volts. The input device 58 can detect a state of the device being monitored 56 based on the received voltage as is conventional. Moreover, the voltage received by the input device 58 while the device to be monitored 56 is in the high impedance state, which is referred to as the sense voltage, also can be used to harvest electrical energy for use when the primary (operating) power source 70 is unavailable.

Figure 3:
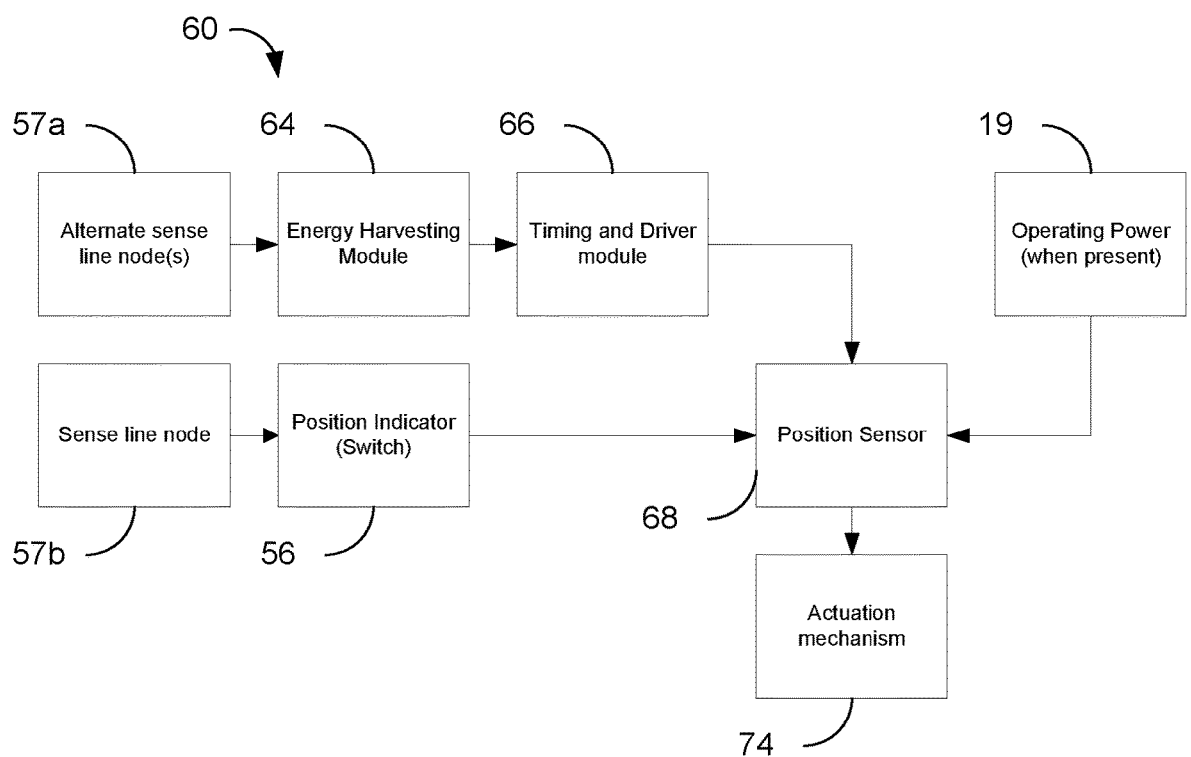
FIG. 3 is a block diagram of an exemplary circuit in accordance with the invention that can provide position information from an electronic switching device when operating power is lost.

Moving to FIG. 3, illustrated is a block diagram of an exemplary indicator circuit 60 in accordance with the present invention. The indicator circuit 60 includes a position indicator (switch) 56 for receiving a sense voltage (via a sense line). The position indicator 56 may be, for example, a semiconductor device or the like (e.g., a field effect transistor or other indication means) for providing a binary state reflecting the output of the position sensor 68. The position sensor 68 may be a sensor element, such as a hall-effect device, optical sensor or other electronic device capable of detecting the position of an object of interest (e.g., a valve position in the described embodiment).

An energy harvesting module 64 is operatively coupled to the alternate sense line(s) 57*a* (also referred to as first sense line(s)), the energy harvesting module 64 configured to harvest electric energy from the sense voltage 52 via resistor 54 provided to the input device 58. For example, when the sense line voltage is high (i.e., when the device being monitored 56 is in the high impedance state) the sense voltage is collected and stored in a device, such as a capacitor. The energy harvesting module 64 operates over a duty cycle, which includes a harvesting stage where energy is collected and stored for later use, and a discharge stage where the stored energy is provided to timing and driver module 66. The device in accordance with the invention will operate on a minimum of two distinct sense lines (57*a*, 57*b*). One or more sense lines can be utilized for energy harvesting via a cross-sourcing configuration. As used herein, cross-sourcing is defined as utilizing a sense line for a device that corresponds to a state opposite to the state of the device being monitored as the source for energy harvesting. Cross-sourcing as illustrated in FIG. 3 could be applied to the two sense line 57*a*, 57*b* example as shown in the valve/actuator application illustrated in FIG. 1. For example, if a first sensor 15*b* is utilized to monitor an OPEN state of the valve 14 and a second, different sensor 17*a* is utilized to monitor a CLOSED state of the valve 14, the sense line 57*a* for the first sensor 15*b* is used to harvest energy for the circuit corresponding to the second sensor 17*a*, and vice-versa. Such cross-sourcing of the sense voltage can enable continuous power harvesting, as not all inputs will be in the low impedance state.

Figure 4A:
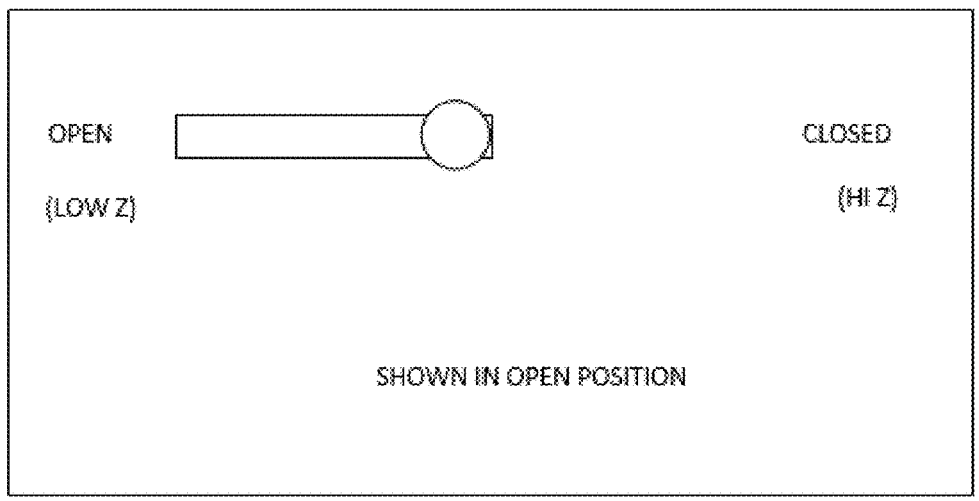
FIGS. 4A-4C illustrate the possible positions of an exemplary two position (OPEN and CLOSED) sensing device.
Figure 4B:
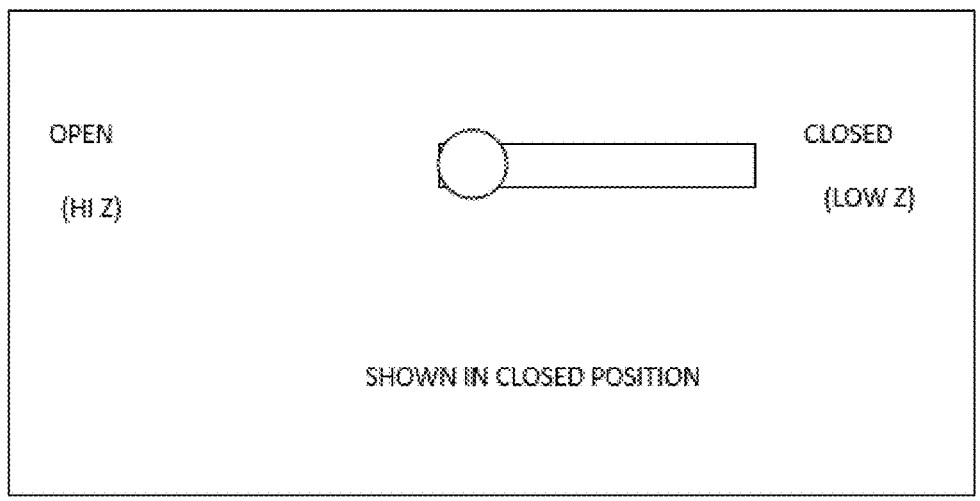
Figure 4C:
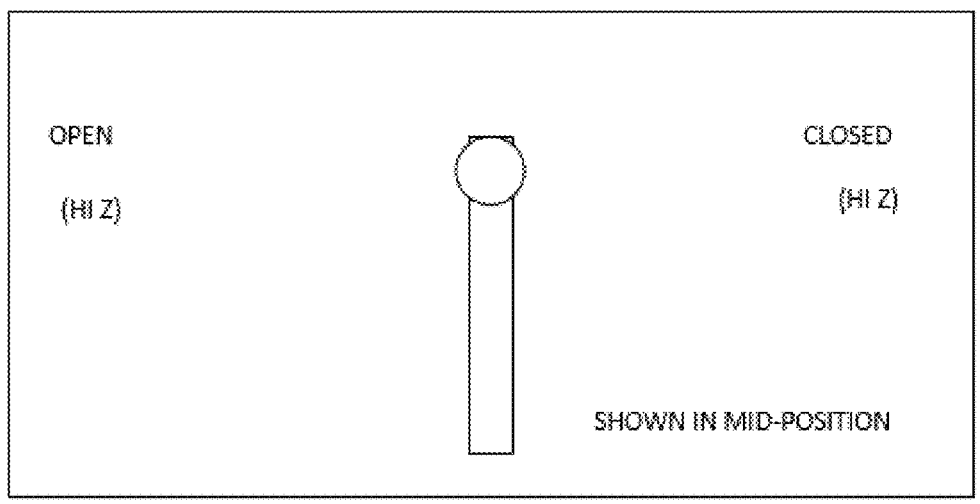

For example, and with reference to FIGS. 4A-4C, the exemplary actuator has two positions: OPEN and CLOSED; thus, it has two position indication circuits. The position indication circuits indicate whether the actuator is in the OPEN position, the CLOSED position, or neither (i.e., travelling mid-position). This can be achieved by driving a position indicator 56, such as a FET, LOW (which acts as a closed "switch") once the sensor 68 detects that the actuator has reached its respective position (the default state of the FET simulates an open "switch"). Now, consider the following three states:

Actuator is in the OPEN position (FIG. 4A): the OPEN position indication circuit outputs a low impedance (closed switch); the CLOSED position indication circuit, however, outputs a high impedance (open switch), which means the CLOSED position indication circuit is capable of harvesting energy.

Actuator is in the CLOSED position (FIG. 4B): the CLOSED position indication circuit outputs a low impedance (closed switch); the OPEN position indication circuit, however, outputs a high impedance (open switch), which means the OPEN position indication circuit is capable of harvesting energy.

Actuator is in the MID (or travelling) position (FIG. 4C): the OPEN position indication circuit outputs a high impedance (open switch); the CLOSED position indication circuit, ALSO, outputs a high impedance (open switch), which means they both circuits are capable of harvesting energy.

If the OPEN position indication "switch" allows harvesting energy to the CLOSED position indication circuit (i.e., cross-sourcing), then in all of the relevant states above the CLOSED position indication circuit will have the energy to change state, and the converse is true. More specifically, in the states listed above the CLOSED position indication circuit does not require energy when the actuator is in the OPEN position, since its default state is high impedance. In the mid-position (i.e., travelling), the CLOSED position indication circuit requires energy to begin polling whether or not the actuator has reached the CLOSED position, since it is possible that it is travelling from the OPEN to CLOSED position. And, naturally, in the CLOSED position the CLOSED position indication circuit requires energy to maintain state detection and to keep the "switch" closed.

Moving back to FIG. 3, a timing and driver module 66 is operatively coupled to the energy harvesting module 64 and to a position sensor 68. The timing and driver module 66 is configured to provide power to the position sensor 68 upon an energy level, harvested by the energy harvesting module 64, exceeding a prescribed threshold level. The timing and driver module 66 may include a plurality of timing circuits and threshold detectors to determine when sufficient energy has been harvested by the energy harvesting module 64, and to ensure the energy is harvested over a prescribed duty cycle.

The position sensor 68 (which is operatively coupled to the energy harvesting module 64 through the timing and driver module 66 to receive power therefrom), is configured to provide a position output corresponding to the position of the actuation mechanism 74. The position detected by the position sensor 68 drives the state of the position indicator 56. The position indicator 56 may utilize the energy provided by the position sensor 68 to "hold" a state of the sensed position over the prescribed duty cycle. Additionally, the position indicator 56 may include circuitry for storing energy needed to latch the state during the harvesting stage. The position sensor 68 may also include an operating power input for receiving power from the primary power source 19 to operate the indicator circuit 60. The position sensor 68 preferably obtains electric power from the operating power input when operating power is present.

The position indicator 56 is operatively coupled to the sense line 57b and to the position sensor 68. The position indicator 56, which may be a semiconductor device, is the "electronic switch" that replaces the mechanical switch 17a, 15b of FIG. 1 (one position indicator 56 for each switch 17a, 15b) and is configured to provide an output based on a detected position of the valve 14 (or other device). For example, if the valve is in the CLOSED position the switch 56 may be in a low impedance state, and if the valve is not in the CLOSED position the switch 56 may be in a high impedance state. The state of the position sensor 68 is communicated to the position indicator 56. The position indicator 56 generates a position output based on the detected state of the valve 14 as provided by the position sensor 68, and holds the position output over a duty cycle of the energy harvesting module 64. An actuation mechanism 74 (e.g., items 12, 14, and/or 16 of FIG. 1) is operatively coupled to the position sensor 68. The actuation mechanism 74 is not supplied with harvested power.

In accordance with the invention, the sense voltage, via the sense line 57b, is applied to position indicator (switch) 56 (which includes a semiconductor) that, depending on position status, provides open/short circuit indication that can be used to detect a state of a device to be monitored. The energy harvesting module 64 captures an allowable amount of energy from the alternate sense line(s) 57a and, once energy is accumulated that is greater than a threshold level, the energy is driven to support circuitry and the position sensor 68. The position sensor 68 senses the position status of the actuation mechanism 74 and drives the position indicator 56 to provide information concerning the state of the sensed device.

Once the input voltage of the timing and driver module 66 has dropped below a predetermined threshold, the driver within the timing and driver module 66 will be disabled and the energy harvesting module 64 will charge back up. During the recharge period the position indicator 56 will maintain its output status until the next period of sensing/driving is attained. This provides a variable duty-cycle of operation while no operating power 70 is supplied to the circuit and sensor. When operating power 70 is present, the circuit and sensor will function at full duty-cycle. As previously stated, this approach allows the utilization of electronic sensors, which require power to operate; the operation, however will be based on a given duty-cycle while operating power is removed.

Figure 5:
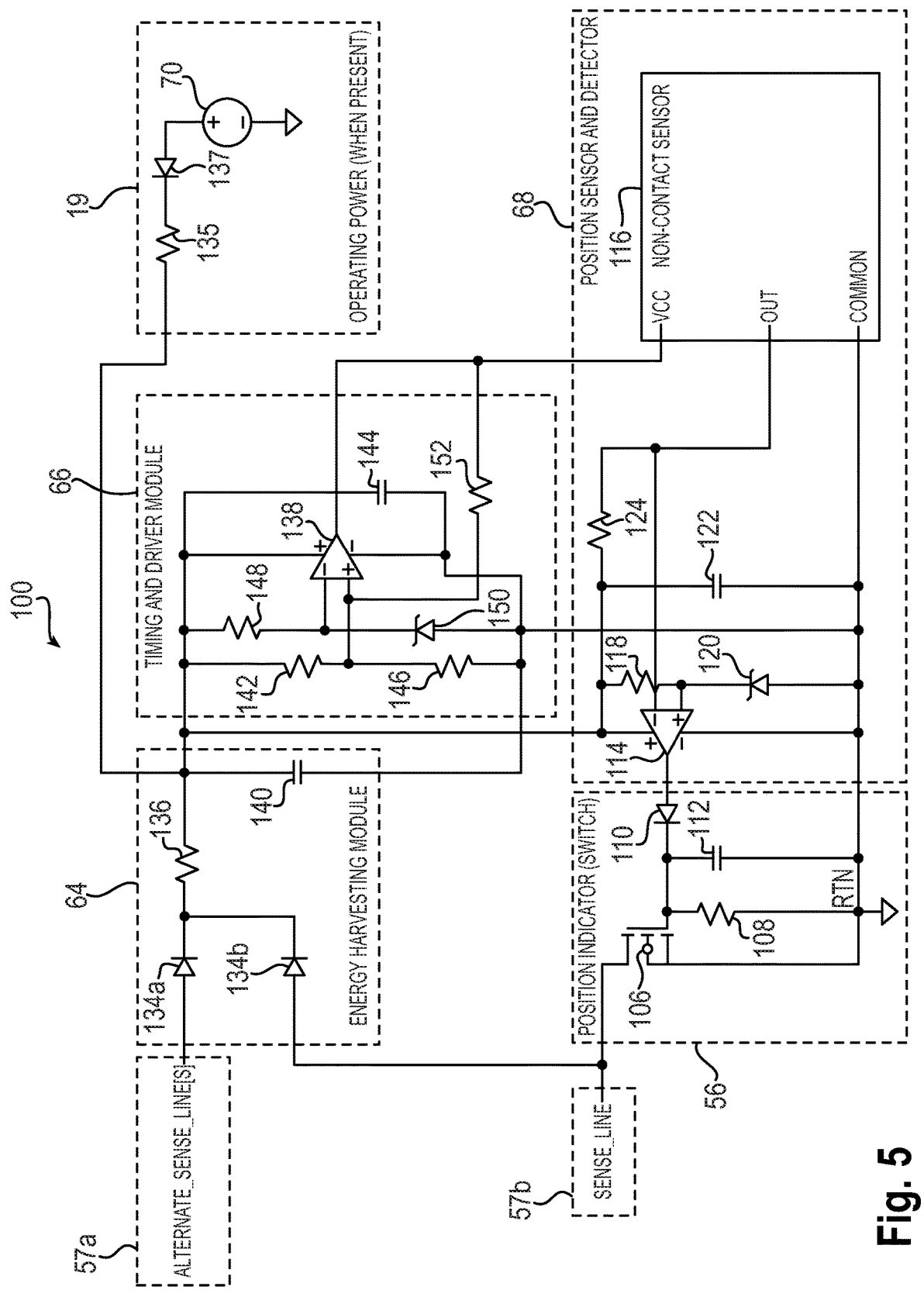
FIG. 5 is an electrical schematic diagram of an exemplary circuit in accordance with the invention.

With additional reference to FIG. 5, illustrated is a schematic diagram of an exemplary circuit 100 in accordance with the present invention. The circuit 100 includes a sense line 57b connected to a first terminal of switching device 106 (e.g., a FET), while a second terminal of switching device 106 is connected to signal common. A third terminal of switching device 106 is connected to a first terminal of resistor 108, to a cathode of diode 110, and to a first terminal of capacitor 112. A second terminal of resistor 108 and a second terminal of capacitor 112 are both connected to signal common. The switching device 106, resistor 108, capacitor 112 and diode 110 form an exemplary position indicator 56.

An output of comparator circuit 114 is connected to the anode of diode 110, a first input of the comparator circuit 114 is connected to an output of a sensor element 116 (e.g., a hall effect device or other electronic sensor), a common connection of the sensor element 116 is connected to signal common, and a second input of the comparator circuit 114 is connected to the cathode of Zener diode 120 and a first terminal of resistor 118. The anode of Zener diode 120 and ground terminal of comparator 114 are connected to signal common. A positive power input of the comparator circuit 114 is connected to a first terminal of capacitor 122, a second terminal of resistor 118, and a first terminal of resistor 124. A second terminal of capacitor 122 is connected to signal common, and a second terminal of resistor 124 is connected to the first input of the comparator circuit 114. The comparator 114, resistors 118 and 124, Zener diode 120, capacitor 122 and sensor 116 form an exemplary position sensor 68.

Alternate sense line(s) 57a is connected to an anode of diode 134a (if more than one alternate sense line, then each is connected to respective diodes), and a cathode of diode 134a is connected to a first terminal of resistor 136 and a cathode of diode 134b. An anode of diode 134b is connected to a sense line 57b. A second terminal of resistor 136 is connected to a first terminal of capacitor 140, and a second terminal of capacitor 140 is connected to signal common. Diodes 134a, 134b, resistor 136 and capacitor 140 form an exemplary energy harvesting module 64.

The second terminal of resistor 136a and the first terminal of capacitor 140 are connected to the power input of the first comparator circuit 114, to the power input of a second comparator circuit 138, to a first terminal of resistor 142, to a first terminal of capacitor 144, to a first terminal of resistor 148, and to a first terminal of resistor 135.

A second terminal of resistor 135 is connected to the cathode of diode 137. The anode of diode 137 is connected to a positive terminal of power source 70. The negative terminal of power source 70 is connected to signal common. Resistor 135, diode 137 and power source 70 form an exemplary operating power source 19.

The second terminal of capacitor 144 is connected to signal common, while the second terminal of resistor 142 is connected to a second input of the comparator circuit 138 and to a first terminal of resistor 146, and a second terminal of resistor 146 is connected to signal common. A first input of the comparator circuit 138 is connected to the cathode of Zener diode 150 and a second terminal of resistor 148. The anode of Zener diode 150 and ground terminal of comparator 138 are connected to signal common. A first terminal of resistor 152 is connected to the second input of the comparator circuit 138, and a second terminal of resistor 152 is connected to an output of the comparator circuit 138 and to a power input of sensor 116.

The resistor 136 and capacitors 122, 140 and 144 form a timing circuit that controls the timing of the energy harvesting cycle. The second comparator circuit 138, resistors 142, 146,148, and Zener diode 150 form a threshold trigger circuit that applies voltage to the sensor 116 once sufficient energy has been harvested. The first comparator circuit 114, resistor 118, and Zener diode 120 form a buffer circuit that drives sufficient energy into capacitor 112, which combined with resistor 108 forms a timing circuit to hold the detected output of the sensor 116 by maintaining the state of switching device 106 over a charge/discharge duty cycle.

For example, and assuming the operating power source 19 is not providing power (e.g., power source 70 has failed), energy from the alternate sense line(s) 57a charges the capacitors 122, 140 and 144 via resistor 136. Once the capacitors 122, 140 and 144 have reached a prescribed charge level, the first and second comparator circuits 114 and 138 become active.

The second comparator circuit 138 selectively applies power to the sensor 116 based on a comparison of the voltage signals provided at its first and second inputs. Thus, the second comparator circuit 138 waits a predetermined time period after it becomes active before providing power to the sensor 116. Once power is applied, the sensor 116 then becomes active and provides a voltage signal to the first input of the first comparator circuit 114 based on the position detected by the sensor 116 (e.g., OPEN or CLOSED). The voltage signal from the sensor 116 is compared to a reference voltage provided at the second input of the first comparator circuit 114. Based on the comparison, the state of the sensor 116 is provided at the output of the comparator circuit 114. The output then charges capacitor 112, which holds the detected state of the sensor over the charge portion of the charge/discharge duty cycle.

Figure 6:
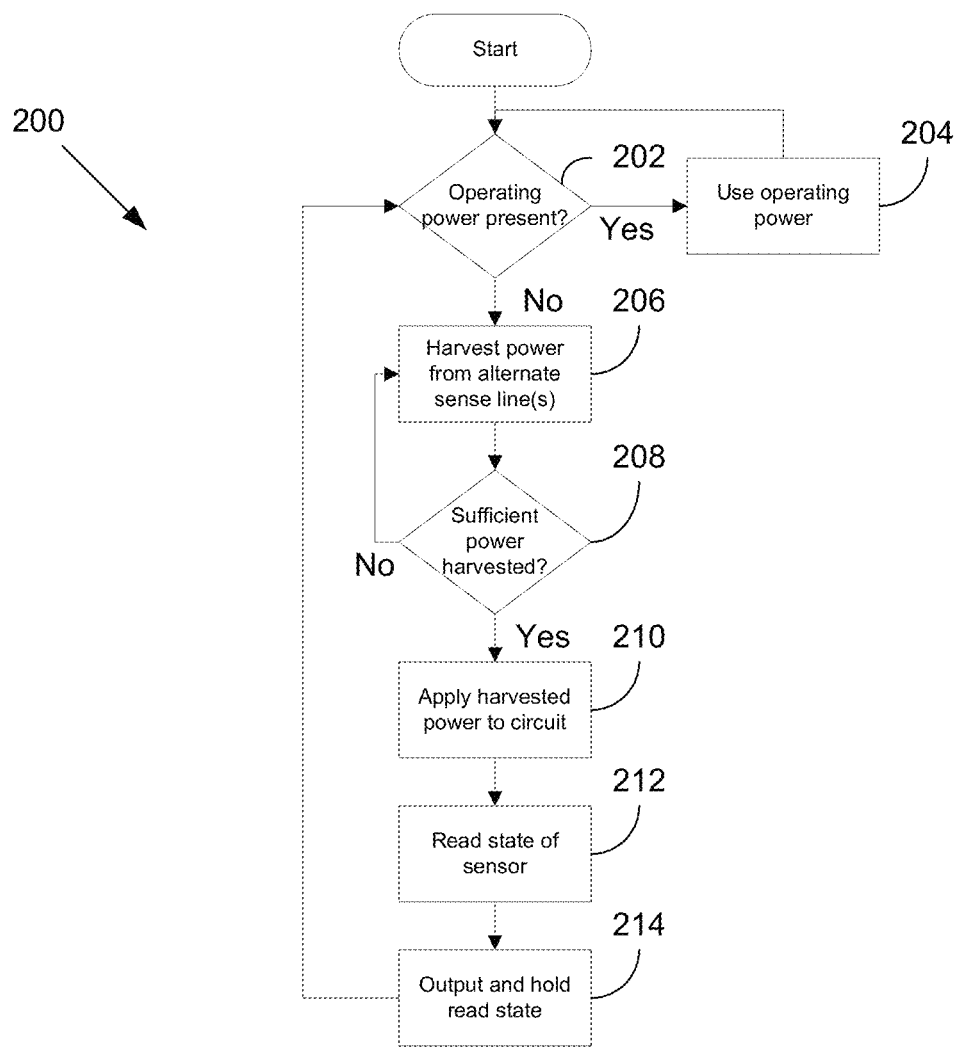
FIG. 6 is a flow diagram illustrating an exemplary method of providing position information in the absence of operating power in accordance with the invention.

Moving now to FIG. 6, a flow diagram 200 illustrates exemplary steps of a method for monitoring a position of a device connected to a secondary power source via a circuit powered by a primary (operating) power source different from the secondary (alternate sense line) power source(s). Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted. The method may be at least partially implemented via hardware (e.g., discrete circuitry, an application-specific integrated circuit (ASIC) or the like).

Beginning at step 202, if operating power is present, then the method moves to step 204 and the circuit and sensors are powered using operating power.

Moving back to step 202, if operating power is not present, the method moves to step 206 where power is harvested from a secondary source, such as alternate sense line(s). Next at step 208 it is determined if sufficient power has been harvested. For example, a voltage across a storage device, such as a capacitor, can be checked to determine if sufficient charge has been accumulated. If sufficient charge has not been accumulated, then the method can move back to 206 and repeat. If sufficient charge has been accumulated, then the method moves to step 210 and the harvested power is applied to the sensor 116 and associated circuitry and its current state is read as indicated at step 212. The method then moves to step 214 where the read state is output and stored so that it may be retained over the next charge phase. The method then moves back to step 202 and repeats.

Although the invention has been shown and described with respect to a certain preferred embodiment, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

The invention claimed is:

1. An indicator circuit for monitoring a position of a device, the indicator circuit comprising:
    a position sensor configured to detect a position of the device;
    a first position indicator operatively coupled to the position sensor and configured to provide a position output corresponding to the position of the device based on the position of the device as detected by the position sensor;
    a first sense line for receiving a sense voltage from a second position indicator different from the first position indicator; and
    an energy harvesting device operatively coupled to the first sense line, the position sensor and the first position indicator, the energy harvesting device configured to harvest electric energy from the sense voltage of the first sense line wherein the harvested electric energy is stored in a capacitor of the energy harvesting device, and wherein the capacitor supplies the harvested electric energy to power the position sensor and the first position indicator.

2. The indicator circuit according to claim 1, further comprising the second position indicator, wherein the second position indicator is complementary to the first position indicator.

3. The indicator circuit according to claim 2, wherein the first sense line corresponds to the second position indicator, further comprising at least one other sense line that corresponds to the first position indicator.

4. The indicator circuit according to claim 3, further comprising a plurality of other position indicators, wherein at the least one other sense line comprises a plurality of other sense lines, respective ones of the plurality of other sense lines corresponding to respective ones of the plurality of other position indicators.

5. The indicator circuit according to claim 1, further comprising an operating power input for receiving operating power to operate the indicator circuit, wherein the first position indicator obtains electric power from the operating power input when operating power is present.

6. The indicator circuit according to claim 1, wherein the position sensor comprises an electronic sensor.

7. The indicator circuit according to claim 6, wherein the position sensor comprises at least one of a hall-effect device or an optical sensor.

8. The indicator circuit according to claim 1, wherein the first position indicator comprises a semiconductor device.

9. The indicator circuit according to claim 1, further comprising a timing and driver module operatively coupled to the energy harvesting device and the first position indicator, the timing and driver module configured to provide power to the first position indicator upon an energy level harvested by the energy harvesting device exceeding a prescribed threshold level.

10. The indicator circuit according to claim 9, wherein the timing and driver module comprises an RC timing circuit.

11. The indicator circuit according to claim 1, wherein the first position indicator is configured to hold the position output over a duty cycle of the energy harvesting device.

12. A method for monitoring a position of a device via a circuit powered by a primary power source, the method comprising:

when the primary power source is inoperative, harvesting energy from a position indicator of a first sensor corresponding to the device being monitored and storing the harvested energy in a capacitor of an energy harvesting device, the position indicator connected to a secondary power source different from the primary power source;

supplying the harvested energy from the capacitor of the energy harvesting device over a duty cycle to intermittently power the circuitry; and using the circuitry to detect a position of the device when the intermittent power is present.

13. The method according to claim 12, wherein the position indicator comprises a first position indicator, and harvesting comprises using a sense voltage from a second position indicator that is complementary to the first position indicator.

14. The method according to claim 12, further comprising outputting and holding the detected position over the duty cycle when the primary power is inoperative.

15. The method according to claim 12, wherein harvesting comprises storing energy until a stored energy exceeds a predetermined threshold level, and outputting the stored energy upon reaching or exceeding the predetermined threshold level.

16. The method according to claim 12, wherein the duty cycle comprises storing energy from an empty energy state to a full energy storage state and discharging the stored energy to the empty state.

* * * * *